(12) United States Patent
Shilane et al.

(10) Patent No.: US 11,507,550 B2
(45) Date of Patent: *Nov. 22, 2022

(54) EVENTUAL CONSISTENCY IN A DEDUPLICATED CLOUD STORAGE SYSTEM

(71) Applicant: EMC IP Holding Company LLC, Hopkinton, MA (US)

(72) Inventors: Philip Shilane, Newtown, PA (US); Venkata Ravi Chandra Bandlamudi, San Jose, CA (US); Atul A. Karmarkar, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 13 days.

This patent is subject to a terminal disclaimer.

(21) Appl. No.: 17/164,301

(22) Filed: Feb. 1, 2021

(65) Prior Publication Data

US 2021/0256005 A1 Aug. 19, 2021

Related U.S. Application Data

(63) Continuation of application No. 16/031,920, filed on Jul. 10, 2018, now Pat. No. 10,956,388.

(51) Int. Cl.
*G06F 16/00* (2019.01)
*G06F 16/21* (2019.01)
(Continued)

(52) U.S. Cl.
CPC ........ *G06F 16/219* (2019.01); *G06F 16/2255* (2019.01); *G06F 16/2329* (2019.01);
(Continued)

(58) Field of Classification Search
CPC ............. G06F 21/6218; G06F 16/9014; G06F 16/9024; G06F 2221/2107; G06F 16/184; G06F 16/1748; G06F 16/219; G06F 16/2255; G06F 16/2329; G06F 16/2365; G06F 16/27; G06F 16/113; G06F 3/0688; G06F 16/1824; G06F 16/2343; G06F 3/061; G06F 3/0643; G06F 11/1096; G06F 11/1464; G06F 11/2094; G06F 11/2097;
(Continued)

(56) References Cited

U.S. PATENT DOCUMENTS

| 10,430,279 B1 * | 10/2019 | Dittia ................... G06F 3/0656 |
| 2013/0054869 A1 * | 2/2013 | Tolia ...................... G06F 16/00 |
| | | 711/E12.007 |
| 2018/0137139 A1 | 5/2018 | Bangalore et al. |

* cited by examiner

*Primary Examiner* — Shyue Jiunn Hwa
(74) *Attorney, Agent, or Firm* — Workman Nydegger (57) ABSTRACT

One example method includes receiving a write request that includes a data structure version to be written, wherein the data structure version is associated with a unique identifier, storing the data structure version in association with the unique identifier, receiving a read request for a most recent version of the data structure and, when the stored data structure version is not the most recent version of the data structure, examining respective unique identifiers of each of a group of other stored data structure versions to determine which stored data structure version is the most recent. Finally, the example method includes returning the most recent data structure version, notwithstanding that one or more other data structure versions existed at the time that the read request was received.

14 Claims, 7 Drawing Sheets

(51) Int. Cl.
*H04L 67/1097* (2022.01)
*G06F 16/27* (2019.01)
*G06F 16/22* (2019.01)
*G06F 16/23* (2019.01)

(52) U.S. Cl.
CPC .......... *G06F 16/2365* (2019.01); *G06F 16/27* (2019.01); *H04L 67/1097* (2013.01)

(58) Field of Classification Search
CPC .... G06F 16/119; G06F 16/128; G06F 16/148; G06F 11/1076; G06F 3/064; G06F 12/0246; G06F 3/0604; G06F 11/1469; G06F 2212/7205; G06F 3/067; G06F 9/45558; G06F 11/1092; G06F 2211/104; G06F 3/0619; G06F 3/0689
See application file for complete search history.

EVENTUAL CONSISTENCY IN A DEDUPLICATED CLOUD STORAGE SYSTEM

RELATED APPLICATIONS

This application is related to U.S. patent application Ser. No. 15/486,430, filed Apr. 13, 2017, and entitled MICROSERVICE BASED DEDUPLICATION. The aforementioned applications are incorporated herein in their respective entireties by this reference.

FIELD OF THE INVENTION

Embodiments of the present invention generally relate to data object access in a storage environment. More particularly, at least some embodiments of the invention relate to systems, hardware, software, computer-readable media, and methods for enabling consistent access to the most recent versions of data objects in a storage environment.

BACKGROUND

It is often the case that a service or application in a computing environment requires access to the most recent version of a data structure, such as a data object, that resides in a storage environment. For various reasons however, it may happen that the data object actually retrieved does not reflect the most recent update made to that data object. For example, if a read operation takes place after an update to the data object, the read operation may not return the updated object.

This may occur, for example, when there is some time between the time that a data object is updated and the time that the updated data object becomes available or accessible to a read operation. Thus, a situation can result where an updated object actually exists at the time the read operation is performed, but the read operation returns an earlier version of that updated object, notwithstanding that the read operation specifically, or implicitly, requested the updated object.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data object access in a storage environment. More particularly, at least some embodiments of the invention relate to systems, hardware, software, computer-readable media, and methods for enabling consistent access to the most recent versions of data objects in a storage environment. Embodiments of the invention may be particularly well suited for use in a deduplicated cloud storage environment, although the scope of the invention is not so limited, and embodiments of the invention can be used in other storage environments as well.

Many object storage environments have a consistency model of eventual consistency. This means that if there is a read operation after an update has been made to a data object or other data structure, the read operation may not return the most recent update to the data object. Such object storage environments may have what is sometimes referred to as "read-after-write consistency." That is, after an object has been written, the name of the object will immediately appear in the list of objects, even though the updated object may not be available or accessible until a later time.

In some cases however, there is a need to be able to access the most recent version of certain data structures written to object storage from any node in cluster. Accordingly, embodiments of the invention embrace, among other things, a protocol for naming data structures so that the most recent update to an object can be retrieved on a consistent basis.

To briefly illustrate, if an object "A" is first written, and then an update to object "A" is written, where the update has the same name, that is, object "A," a read request made after the update to object "A" may not receive the updated object "A," at least not right away. Thus, for a period of time at least, either version of "A" may be returned. It is also possible that, for a period of time, different readers may receive different versions of object "A." Eventually however, the updated object "A" will become available and will be returned in response to a read request. This is sometimes referred to as the eventual consistency model. Embodiments of the invention avoid this problem by assigning a new name to the update of object "A." Thus, when a read request specifies the new name, there is no question as to which version of object "A" will be received, since there is only one object, that is, the updated object "A," that bears the new name. Advantageously, the updated object "A" with the new name may be returned by a read operation relatively more quickly than an update that bears the same name as the prior version of the object.

Many of the data structures employed by embodiments of the invention, such as the object recipes, slice recipes, and compression regions disclosed herein, are immutable by design so that there are never multiple versions that could be misread. As part of a metadata micro-service, for example, a structure referred to as a similarity group is updated. Before the updated similarity group is written to object storage, a transaction ID is appended to the name of the similarity group, and always read from object storage the version with the highest transaction ID.

As part of a deduplication microservice, for example, an updateable structure called a similarity group is provided. Before writing an updated similarity group to object storage, a transaction ID is appended to the name, and the version with the highest transaction ID is always read from object storage. The size of similarity groups may be controlled such that they fit in a memory cache and can be read from object storage quickly. This may be achieved, for example, by capping a similarity group size and creating a new similarity group with an incremented subgroup ID. This disclosure also provides an example algorithm for creating consistency and high performance utilizing object storage with an eventual consistency model.

Advantageously then, embodiments of the invention enable consistent access to a most recent update of a data object, in a deduplicated cloud storage environment that employs an eventual consistency approach, that is, a read-after-write consistency model. Thus, a user can be reassured that, notwithstanding the implementation of the eventual consistency model in the storage environment, the user will always receive the most recent update of a data object. This functionality may be particularly useful in the implementation of microservices, such as a deduplication microservice for example, that require access to the most recent versions of data objects.

As the foregoing examples illustrate, embodiments of the invention may improve the efficiency and effectiveness of the operation of a computing system, or element of a computing system. Aspects of the disclosed processes and methods are discussed below in connection with various illustrative examples.

A. Aspects of an Example Operating Environment

The following is a discussion of aspects of example operating environments for various embodiments of the invention. This discussion is not intended to limit the scope of the invention, or the applicability of the embodiments, in any way.

At least some embodiments of the invention may be employed in connection with a microservice, such as a microservice that provides deduplicated object storage in a cloud storage environment. One example of such a cloud storage environment is the Amazon Web Services (AWS) Simple Storage Service (S3) storage environment, although the scope of the invention is not so limited, and the functionalities disclosed herein can be employed in additional, or alternative, storage environments. Embodiments of the invention may be especially well suited for deployment in connection with a Platform as a Service (PaaS), that is, a cloud computing service that provides a platform that enables customers to develop, run, and manage their applications.

In more detail, the deduplicated object storage microservice, which may be referred to herein as simply the DD Microservice, provides deduplicated object storage in multiple cloud sites using the underlying object storage for internal structures. This microservice scales up and down based on client demand. The data structures disclosed herein may be stored in an underlying object storage system of a cloud provider, examples of which include, but are not limited to, AWS S3, Azure Blob storage, Dell EMC Virtustream, Dell EMC Elastic Cloud Storage (ECS), and Google Cloud Storage.

More generally, the data protection environment may take the form of a cloud storage environment, an on-premises storage environment, and hybrid storage environments that include public and private elements, although the scope of the invention extends to any other type of data protection environment as well. Any of these example data protection environments, may be partly, or completely, virtualized.

In addition to the data protection environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, database applications such as SQL Server, filesystems, as well as datastores such as Oracle databases for example. The applications on the clients may generate new and/or modified data that is desired to be protected.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information. Moreover, the term data backups is intended to be construed broadly and includes, but is not limited to, partial backups, incremental backups, full backups, clones, snapshots, any other type of copies of data, and any combination of the foregoing. Any of the foregoing may, or may not, be deduplicated.

As used herein, deduplication refers to methods of storing only portions of data that are not already stored in the storage. For example, when multiple versions of a large text document, having only minimal differences between each of the versions, are stored without deduplication, storing each version will require approximately the same amount of storage space of a persistent storage. In contrast, when the multiple versions of the large text document are stored with deduplication, only the first version of the multiple versions stored will require a substantial amount of storage. Once the first version is stored in a persistent storage, the versions of the large word document subsequently stored will be deduplicated before being stored in the persistent storage resulting in much less storage space of the persistent storage being required to store the subsequently stored versions when compared to the amount of storage space of the persistent storage required to store the first stored version.

In one or more embodiments of the invention, deduplication may include receiving data and dividing the data into slices by one or more frontend microservices. The slices, in turn, are subdivided into segments. In at least one implementation, these segments are approximately 8 KB, with the segment boundary selected in a content-defined manner that tends to produce consistent segments. The slices may be deduplicated by one or more backend micro-services by matching each slice to a similarity group. The meta-data associated with the matched similarity group may specify fingerprints of a subset of segments of all the segments stored in the object storage. For each slice, a respective fingerprint of each segment of the slice may be created by hashing the segment to generate the fingerprint. In some embodiments, the fingerprint, that is, the hash, may have a size of about 20 bytes and, as noted above, the segments may be about 8 KB in size, in some embodiments. Thus, for each slice, a fingerprint of each segment of the slice may be matched to the fingerprints of the subset of the segments. Any segments whose respective fingerprints are not matched to any of the fingerprints of the subset of the segments may be added to one or more compression regions. Such segments may be referred to as non-duplicate segments. Fingerprints, corresponding to each fingerprint that was not matched, may be added to the meta-data of the similarity group. A combination of fingerprints and compression regions is added to the similarity group. This combination may be organized, for example, as <Compression Region Name, Fp1, Fp2, . . . FpN> where there are N segments in a compression region represented by fingerprints 1 through N. The one or more compression regions may be stored in the object storage. Slice recipes and an object recipe that allow for each slice of the data and the data, respectively, to be reconstructed from the data stored in the object storage may be stored for future use.

Figure 1:
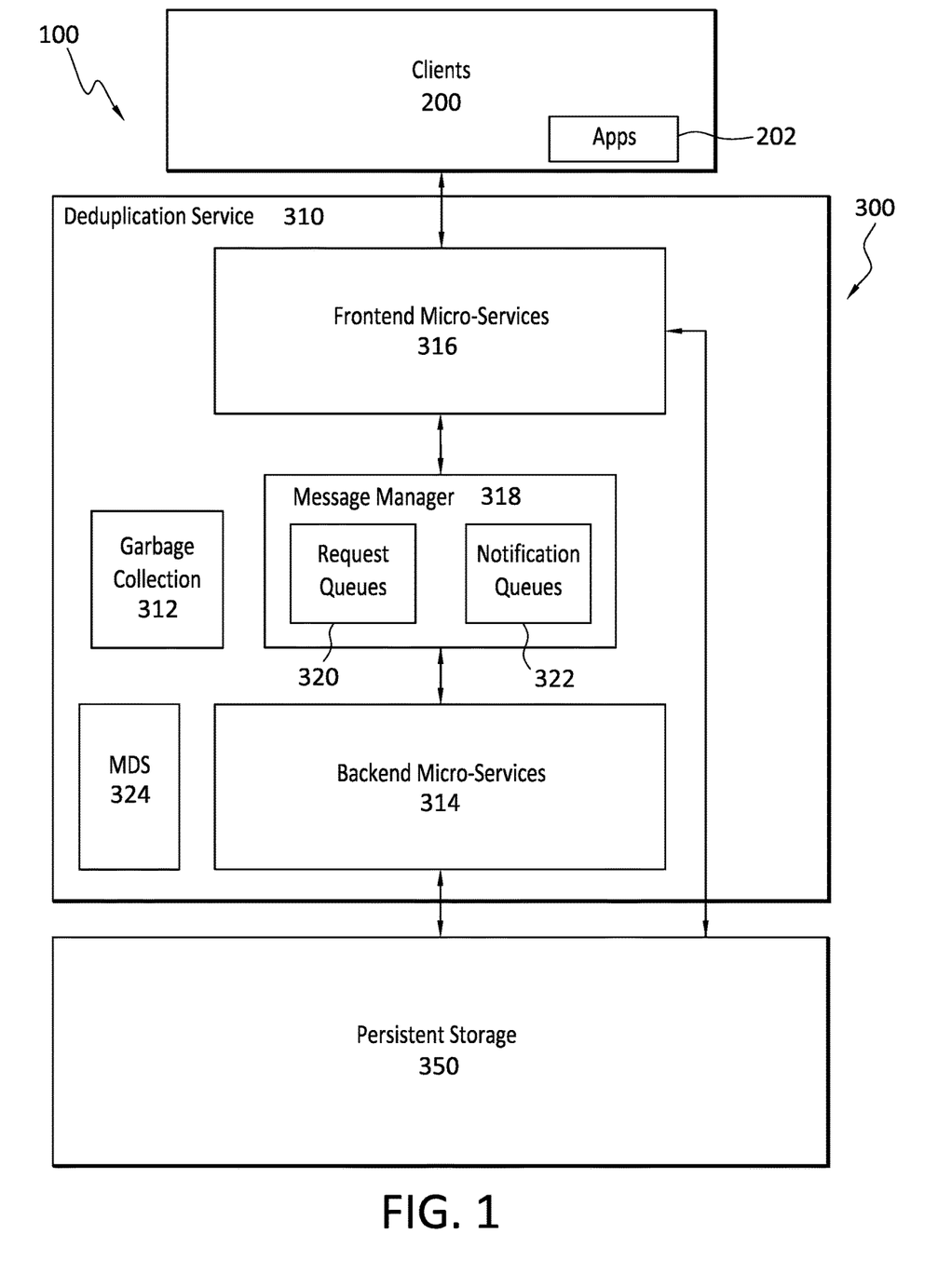
FIG. 1 discloses aspects of an example operating environment for some embodiments of the invention.

With particular reference now to FIG. 1, an example operating environment 100 may include a plurality of clients 200. Each of the clients 200 may host one or more applications 202 that create new and/or modified data that is desired to be protected. As such, the clients 200 are examples of host devices. One, some, or all, of the clients 200 may take the form of a VM, although that is not required. In general, the VM is a virtualization of underlying hardware and/or software and, as such, one or more of the clients 200 may include or otherwise be associated with various underlying components. The clients 200 may each also include a respective backup client application (not shown). More generally, the clients 200 can take a variety of different forms, examples of which include, but are not limited to, databases, smartphones, fileservers, and virtual clients.

With continued reference to FIG. 1, the example operating environment 100 may further include a cloud storage environment, examples of which are disclosed elsewhere herein. In general, the clients 200 communicate, directly or indirectly, with the cloud storage environment 300 to read data from, and write data to, the cloud storage environment. The cloud storage environment may provide various services to the clients 200 including, for example, a data deduplication service 310, discussed in more detail below. As well, garbage collection 312 may be provided as part of the data deduplication service 310, or separate from the data deduplication service 310.

With continued reference to FIG. 1, it will be appreciated that any number of variations to the illustrated configuration are possible. For example, the cloud storage environment 300 may be a public cloud, or a private cloud. As well, one or more of the clients 200 may be running in the cloud storage environment 300, rather than outside the cloud storage environment 300 as illustrated. As another example, the data deduplication service 310 may run in the cloud storage environment 300, as illustrated, or at one or more of the clients 200.

As these examples indicate, the configuration and arrangement of elements illustrated in FIG. 1 are provided only by way of example, and are not intended to limit the scope of the invention in any way. Moreover, while elements such as the data deduplication service 310 and/or garbage collection 312 may run in the cloud storage environment 300, for example, as containers in a Kubernetes cluster, the scope of the invention is not limited to that particular implementation.

With continued reference to the example of FIG. 1, the clients 200 may store data in the persistent storage 350. The deduplication service 310 deduplicates the data from the clients 200 before the data is stored in the persistent storage 350.

The clients 200 may be computing devices. The computing devices may be, for example, mobile phones, tablet computers, laptop computers, desktop computers, or servers. Further examples of 200 include clients that are running in the cloud, such as on a virtual machine or in a container running in a public and/or private cloud environment. The clients 200 may be operably connected to the deduplication service 310. While not shown in FIG. 1, the clients 200 may be operably connected to the persistent storage 350 or other elements of the system without departing from the invention.

The persistent storage 350 may be hard disk drives, solid state drives, any other type of persistent storage media, or a logical storage including any combination of the aforementioned storage media and/or other types of persistent storage. In one or more embodiments of the invention, the persistent storage 350 may be a cloud storage service. A cloud storage service may be a logical storage that includes any number of physical storage devices operably connected and/or unified to form a logical storage. The logical storage may include redundancy or other data integrity features that ensure that failure of any of the physical storage elements does not cause data stored in the logical storage to be lost.

The persistent storage 350 may store data from the clients 200, slice recipes generated by backend micro-services 314 of the deduplication service 310, and object recipes generated by the frontend micro-services 316. Thus, in at least some embodiments, the persistent storage 350 may simply comprise, or consist of, object storage to which all of the persistent structures are written.

As used herein, an object storage is a data storage architecture that manages data as objects. Each object of the object storage may include data, meta-data, and/or a globally unique identifier of the object. The object may include a number of bytes for storing data in the object. Each object of the object storage may include a different number of bytes without departing from the invention. In one or more embodiments of the invention, the object storage does not include a file system.

The persistent storage 350 may be operably connected to the deduplication service 310. While not shown in FIG. 1, the persistent storage 350 may be operably connected to the clients 200 or other elements of the system without departing from the invention.

The deduplication service 310 may receive data from the clients 200 and deduplicate the data before storing the data in the persistent storage 350. The deduplication service 310 may also provide data, stored in the object storage, in response to requests for the data from the clients 200. In one or more embodiments of the invention, the deduplication service 310 may be a service executing on a cloud platform, for example, a platform as a service (PaaS).

As used herein, a cloud platform is a logical computing resource that abstracts the aggregated physical resources of one or more physical computing systems. One or more of the physical computing systems may be a physical device that includes non-transitory storage, memory such as Random Access Memory (RAM), and one or more processors.

In one or more embodiments of the invention, the deduplication service 310 may be a physical device that includes non-transitory storage, memory, and one or more processors. The physical device may be, for example, a server. The physical device may be other types of computing devices without departing from the invention. The non-transitory storage may include instructions which, when executed by the one or more processors, enable the physical device to perform the functions disclosed herein.

The deduplication service 310 may include frontend micro-services 316 that receive data from clients 200, backend micro-services 314 that deduplicate slices of the received data, and a message manager 318 that manages requests and notifications between the frontend micro-services 316 and the backend micro-services 314. The frontend micro-services 316 and backend micro-services 314 may also facilitate providing data stored in the object storage to the clients 200. Each component of the deduplication service 310 is described below.

The frontend micro-services 316 may be one or more services that receive data sent by the clients 200 for storage in the persistent storage 350, prepare the data for deduplication, and forward the prepared data to the backend microservices 314. In one or more embodiments of the invention, the frontend micro-services 316 may be micro-services executing on a cloud platform. The frontend micro-services 316 may also obtain requests for data stored in the persistent storage 350.

While not specifically illustrated in FIG. 1, the system may include a load balancer that receives all, or a portion thereof, of the requests to store and/or obtain data in the object storage from the clients 200 and distributes the requests to the frontend microservices. In some embodiments, the message manager 318, including the request and notification queues 320 and 322, respectively, may be replaced by the load balancer. In these embodiments, a frontend, which may include the frontend micro-services 316, communicates through the load balancer to a backend, which may include the backend micro-services 314, and responses come back to the frontend.

The number of frontend micro-services may be dynamically adjusted, i.e., additional instances of the frontend micro-services may be instantiated or existing instances of the frontend micro-service may be terminated, to match the request processing capacity of the frontend micro-services 316 to the rate of requests for storing data in the object storage from the clients 200. For example, the number of requests from the clients may exceed the request processing capacity of the frontend micro-services 316 resulting in the development of a backlog of requests and thereby resulting in a mismatch. In another example, the number of requests from the clients may be exceeded by the request processing capacity of the frontend micro-services 316 resulting in idle frontend micro-services and thereby resulting in a mismatch.

The message manager 318 may facilitate transmission of requests and notifications between the frontend micro-services 316 and the backend micro-services 314. In one or more embodiments of the invention, the message manager 318 may be a service executing on a cloud platform. The message manager 318 may include request queues 320 and notification queues 322. Each of the queues is discussed below.

The request queues 320 may be one or more queues that queue slices of data generated by the frontend micro-services 316 for processing by the backend microservices 314 or queue slices of data reconstructed by the backend micro-services 314 for use by the frontend micro-services 316 when reconstructing stored data. Each of the queues of the request queues 320 may be first in first out queues. The queues of the request queues 320 may be other types of queues without departing from the invention. For example, the queues may be configured to prioritize certain slices for processing by the backend micro-services 314 over other slices. For example, certain slices may be moved to the front of the queue based on a type, quality, or meta-data associated with the slices.

In one or more embodiments of the invention, a first queue may be assigned to facilitate storing of data in the object storage and a second queue may be assigned to facilitate reading of data from the object storage. For example, the first queue may send slices of data to the backend micro-services 314 for processing when data is being stored in the object storage and the second queue may send reconstructed slices of data to the frontend micro-services 316 for processing when data is being read from the persistent storage 350. The second queue may be a notification queue 322 that enables a backend micro-service 314 to send a reconstructed slice to a specified frontend micro-service 316. The first queue may be a request queue 320 that enables a frontend micro-service 316 to send a slice request or a slice to any backend micro-service 314 without specifying the specific micro-service that will receive the request. In other words, the first queue may send requests to any backend micro-service while the notification queue may send reconstructed slices to frontend micro-services that requested the slice that has been reconstructed.

The backend micro-services 314 may be one or more micro-services that receive slices of data from the message manager 318 for storage in the persistent storage 350, deduplicate the slice, and store the unique segments from a slice in a compression region in the persistent storage 350. The backend micro-services 314 may be micro-services executing on a cloud platform. The backend micro-services 314 may also obtain requests for slices of data stored in the persistent storage 350.

While the frontend micro-services 316 and backend micro-services 314 have been described as separate services, embodiments of the invention are not limited to separate services performing the functionality of the frontend and backend microservices respectively. The functionality of the frontend and backend micro-services may be performed by a single service without departing from the invention. For example, a single service may perform the functionality, described herein, of both the frontend and backend micro-services.

Figure 1A:
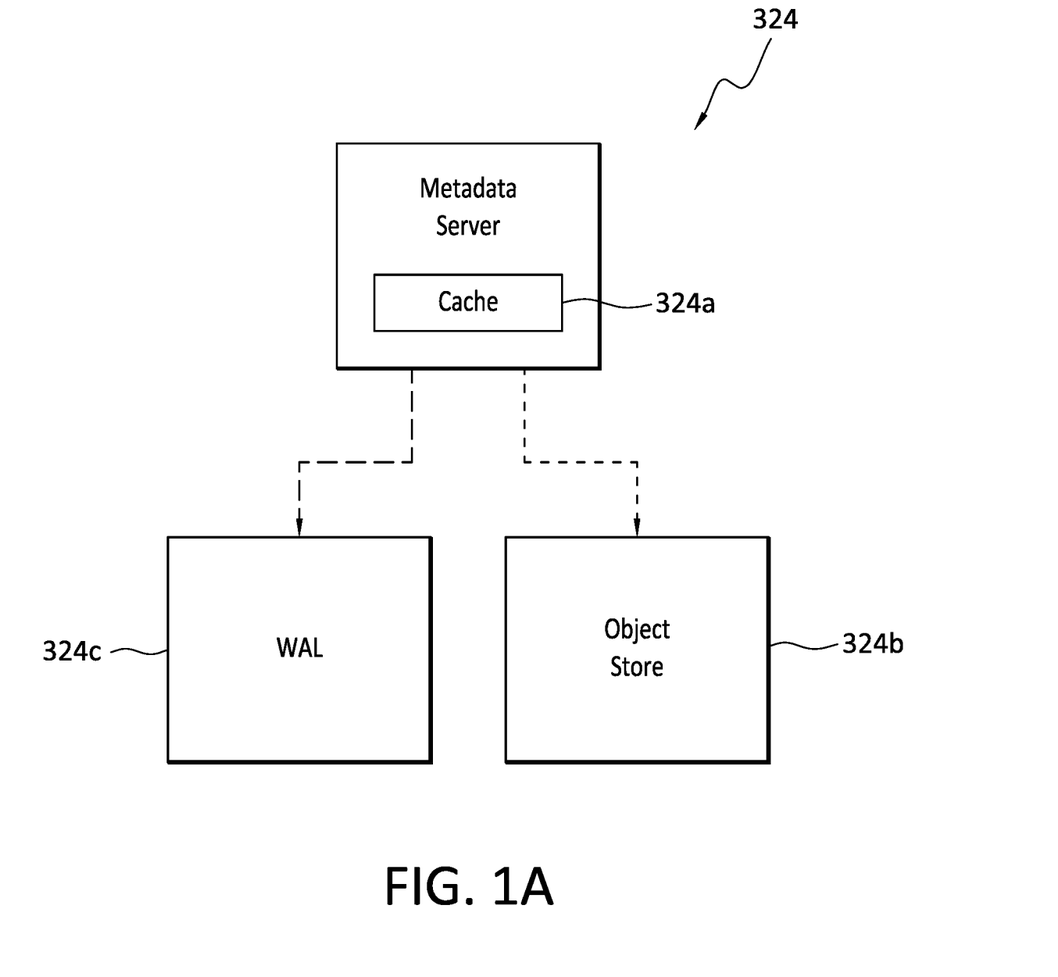
FIG. 1a discloses aspects of an example metadata server and associated components.

With continued reference to FIG. 1, and directing attention now to FIG. 1a as well, the cloud storage environment 300 may include a metadata server (MDS) 324. In some instances, the MDS 324 may be an element of the deduplication service 310, although that is not required. In some implementations, an in-memory cache 324a of the MDS 324 enables fast access to records and other information stored in the MDS 324. An associated object store 324b provides persistence of the stored records and information, and a write ahead log (WAL) 324*c* stores incremental changes persistently to provide crash recovery in the event that a problem occurs with the MDS 324 and/or other elements of the operating environment 100.

B. Object Recipes, Slice Recipes, and Similarity Group

By way of introduction, embodiments of the invention may employ object recipes, slice recipes, and similarity groups. In brief, embodiments of the deduplication service 310 can run in a cloud environment where components run in containers and scale up and down as needed. The deduplication service 310 splits client-written objects into slices, such as ~8 MB slices for example, which each consist of segments, such as ~8 KB segments for example. To perform deduplication, each slice is mapped to a similarity group, which is likely to have many identical segments that are already stored. Fingerprints from the incoming slice that match fingerprints in a similarity group are marked as duplicate, otherwise they are new segments that must be stored. The MDS 324 is queried when a processing node needs to determine if a group of segment fingerprints are unique or duplicate. The MDS 324 is also queried during restores because the similarity groups record the segment-to-compression region mapping, where a compression region is a compressed group of segments stored to the persistent storage 350.

Figure 2A:
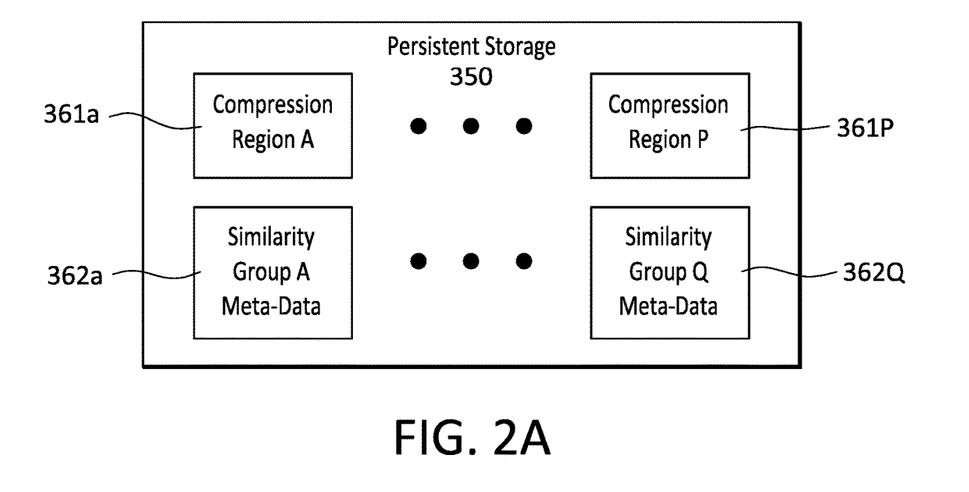
FIG. 2a discloses aspects of an example persistent storage configuration and arrangement.

With reference now to FIG. 2*a*, further details are provided concerning information stored in the persistent storage 350 (FIG. 1). For example, the persistent storage 350 may store compression regions 361*a* and 361*p*, and similarity group meta-data 362*a* and 362*q*. Each of the compression regions 361*a* and 361*p* may store one or more segments of one or more slices of data. As used herein, a compression region is one or more pieces of data that are aggregated and/or compressed.

Compression regions may be shared by multiple objects, and this is one way that the advantage of deduplication is achieved. In some embodiments, compression regions are named with, or may at least include, the SHA1 hash of the data within the compression region. Because each compression region contains deduplicated data, the data in each compression region is unique and, correspondingly, the hash of that data is likewise unique. In more detail, the non-duplicate segments for an object are stored in one or more compression regions. Because of the nature of deduplication, segments can be shared across objects, so compression regions are not names based on object names. Instead, and as noted above, the name for a compression region may include as hash of the content. Hash functions other than the SHA1 hash function may alternatively be used. In this way, compression regions are named uniquely. Moreover, if a second compression region with the same segments were to be stored, that second compression region would have the same hash value and compression region name, and would replace the previous, matching, compression region without any data loss.

Each of the similarity group meta-data 362*a* and 362*q* may specify meta-data associated with a similarity group. The meta-data of each similarity group may specify a sketch and a number of fingerprints. The sketch may be used to match slices of data to the similarity group. The fingerprints may be used to determine whether a segment of a slice of data that mapped to a similarity group is already present in the object storage.

Figure 2B:
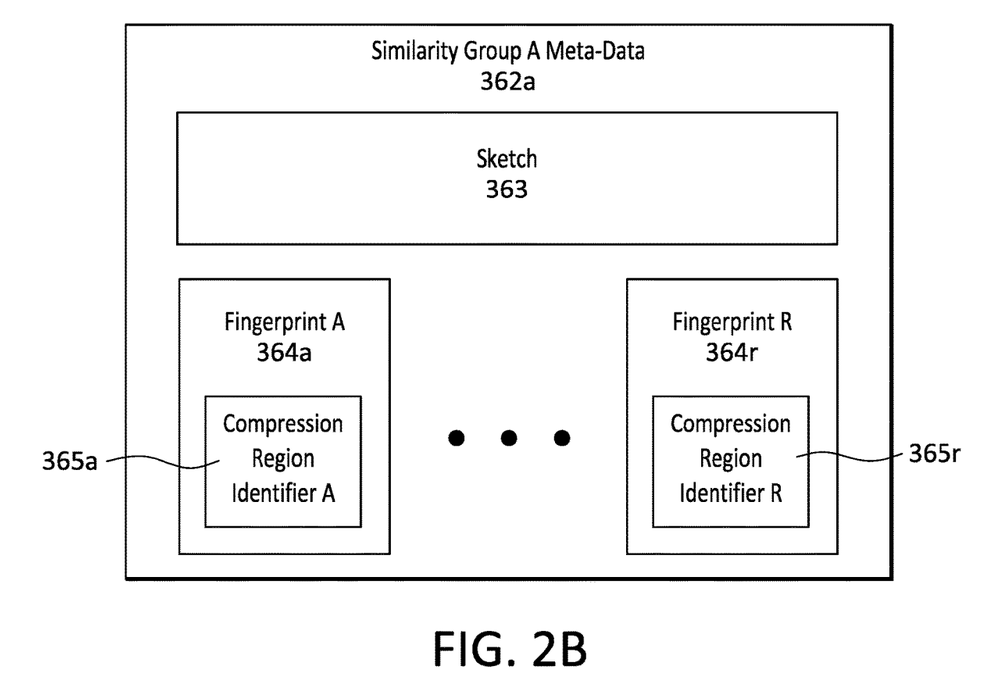
FIG. 2b discloses aspects of an example similarity group configuration and arrangement.

FIG. 2*b* shows an example of a similarity group A meta-data 362*a*. The similarity group A meta-data 362*a* includes a sketch 363 and a number of fingerprints 364*a*-364*r*. In one or more embodiments of the invention, a sketch may be a bit sequence that does not uniquely identify a slice. Rather, the sketch may be a bit sequence that identifies a group of slices that each include similar but unique data or include identical data. In other words, the sketch of multiple, different slices may be the same bit sequence if each slice includes similar but unique data or includes identical data.

In one or more embodiments of the invention, a fingerprint may be a bit sequence that virtually uniquely identifies a segment of a slice. As used herein, virtually uniquely means that the probability of collision between the fingerprints of two segments that specify different data is negligible, compared to the probability of other unavoidable causes of fatal errors. In one or more embodiments of the invention, the probability is $10^{-20}$ or less. In one or more embodiments of the invention, the unavoidable fatal error may be caused by a force of nature such as, for example, a tornado. In other words, the fingerprint of any two segments that specify different data will virtually always be different.

Each fingerprint 364*a*-364*r* of the similarity group A meta-data 362*a* may include a compression region identifier 365*a*-365*r*. The compression region identifier 365*a*-365*r* may specify a compression region where a segment of a slice having the same fingerprint as specified by the fingerprint 364*a*-364*r* is stored. In other words, each fingerprint 364*a*-364*r* may specify where a segment having the fingerprint specified by the fingerprint 364*a*-364*r* is stored.

One alternative implementation involving fingerprints and compression region identifiers takes into account the fact that compression region identifiers may be fairly long and the compression regions may have multiple segments. In this circumstance, it can be more efficient, in the similarity group, to employ a compression region identifier and then a list of fingerprints corresponding to the segments in the compression region. This approach may take up less storage space than the arrangement and configuration indicated in FIG. 2*b*.

While the similarity group meta-data has been illustrated as only including a sketch 363 and fingerprints 364*a*-364*r*, the similarity group meta-data may include other data. For example, the similarity group may specify a length of a compression region, an offset from the start of a compression region, a bit sequence, a name, or other types of data without departing from the invention.

Returning to FIG. 2*a*, while the persistent storage 350 has been illustrated as including compression regions and similarity group meta-data, other types of data may also be stored in the persistent storage 350 without departing from the invention. For example, the meta-data associated with each compression region may specify segment boundaries between multiple segments that are stored in each compression region, keys to portions of the compression region, or other data that may identify or specify portions of a compression region.

Figure 2C:
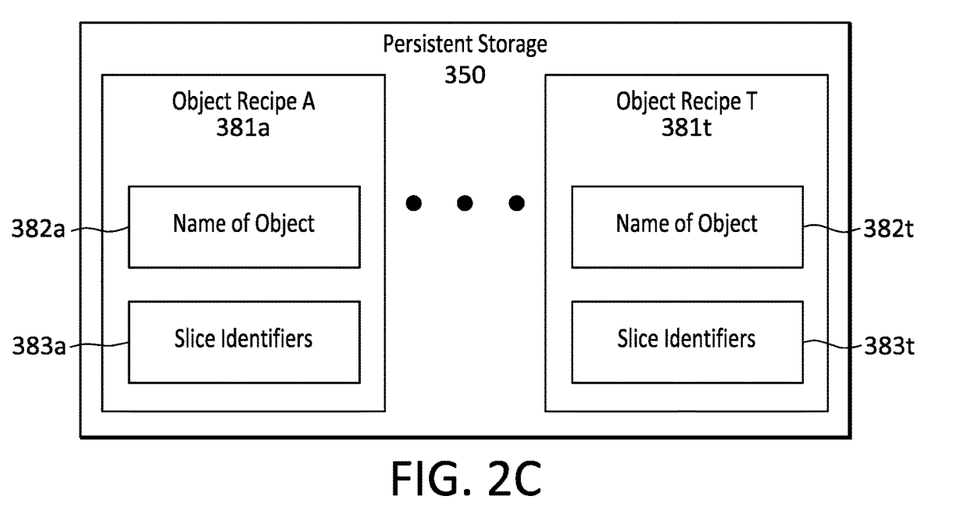
FIG. 2c discloses aspects of an example persistent storage configuration and arrangement.

With reference next to FIG. 2*c*, the persistent storage 350 may include a number of object recipes 381*a*-381*t* that include data that may be used to reconstruct a data object. The data object may be, for example, a data file or a portion of a data file that has been previously stored in the persistent storage 350 (see FIG. 2*a*). Each object recipe 381*a*-381*t* may include a name of an object 382*a*-382*t* and slice identifiers 383*a*-383*t*.

The name of an object 382*a*-382*t* of each object recipe 381*a*-381*t* may be a name of a data object stored in the object storage. The name of the object 382*a*-382*t* may be used to identify the object recipe 381*a*-381*t* when an entity requests to read a data stored in the object storage. A timestamp may be added to object recipe names to address the case where a client writes multiple objects with the same name in a short period of time. The timestamp is added to the key for the object recipe, and in this way, the name provided by the client is still distinguished.

The slice identifiers 383a-383t may specify one or more slice recipes 371a-371u stored in the persistent storage 350. The slice recipe identifiers 383a-383t may be passed to the backend micro-services 314 to obtain each of the slices of data corresponding to each of the slice recipes. The slice identifiers 383a-383t may be, for example, one or more keys, bit sequences, or other data that enables the backend micro-services to obtain a corresponding slice recipe. While the object recipes 381a-381t have been illustrated as only including a name of an object 382a-382t and slice identifiers 383a-383t, the object recipes 381a-381t may include other data without departing from the scope of the invention.

Figure 2D:
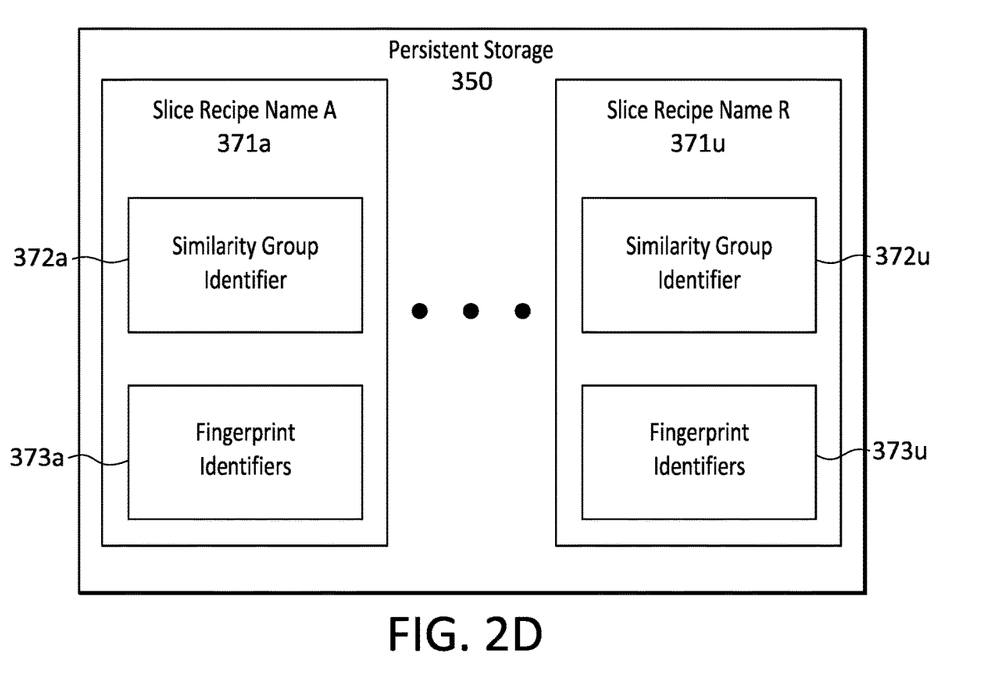
FIG. 2d discloses aspects of an example similarity group configuration and arrangement.

With reference now to FIG. 2d, the persistent storage 350 may include a number of slice recipes 371a-371u that include data that may be used to reconstruct a slice of data. Each slice recipe 371a-371u may include a similarity group identifier 372a-372u and fingerprint identifiers 373a-373u.

The slice recipe may have a name, such as slice recipe name A, that uniquely identifies the slice of data. In at least some embodiments, the name of the slice recipe includes the name of the associated object from which the slice was taken, along with a unique identifier such as a timestamp. As such, different versions of an object will have different respective slice recipes. The similarity group identifier 372a-372u may specify a similarity group and the corresponding meta-data 362a-362q (see FIG. 2a) of the similarity group. The similarity group identifier 372a-372u may be, for example, a key, bit sequence, or other data that enables the corresponding meta-data to be obtained.

The fingerprint identifiers 373a-373u may specify one or more fingerprints 364a-364r of the similarity group meta-data that corresponds to the similarity group specified by the similarity group identifier 372a-372u. The fingerprint identifiers 373a-373u may be, for example, one or more keys, bit sequences, or other data that enables the one or more fingerprints 364a-364r (see FIG. 2b) of the similarity group meta-data to be obtained. Obtaining the one or more fingerprints 364a-364r (see FIG. 2b) may enable segments of the slice stored in compression regions specified by the compression region identifier 365a-365r (see FIG. 2b) to be obtained. While the slice recipes 371a-371u have been illustrated as only including a similarity group identifier 372a-372u and fingerprint identifiers 373a-373u, the slice recipes 371a-371u may include other data.

Figure 3A:
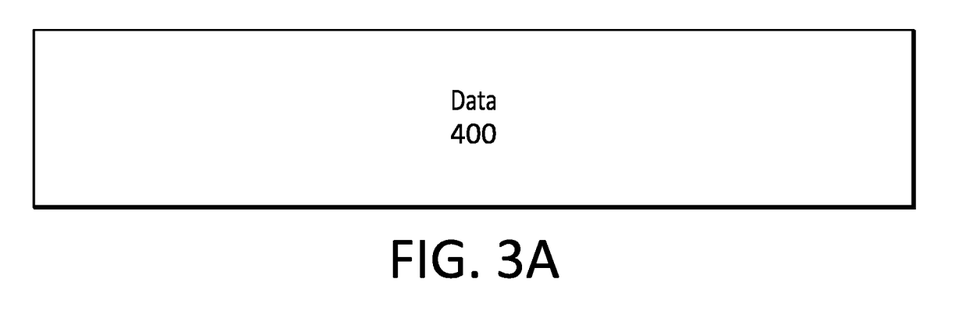
FIG. 3a discloses aspects of some example data.
Figure 3B:
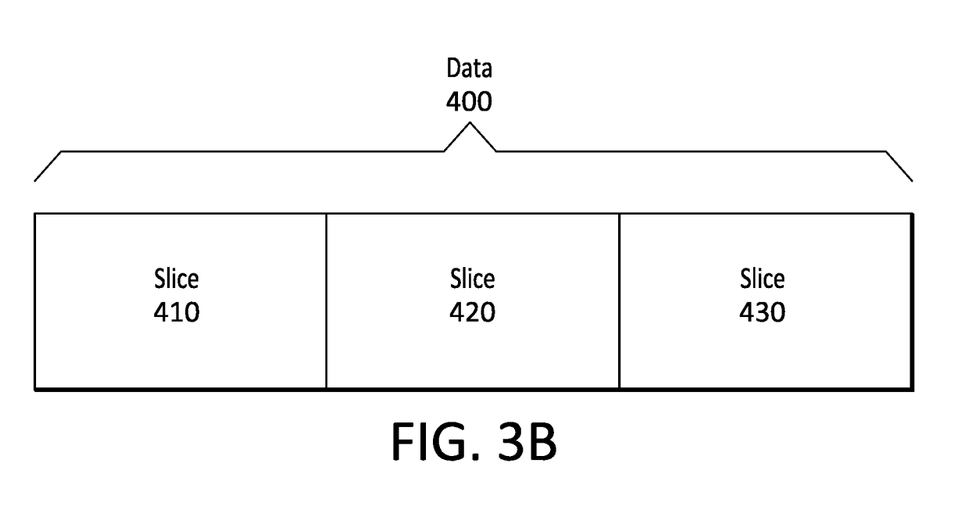
FIG. 3b discloses aspects of example slices of data.

FIGS. 3a-3b illustrate relationships between data 400, slices 410, 420, and 430 of the data 400, and segments 411, 412 and 413 of a slice 410 of the data 400, respectively. FIG. 3a is a diagram of data 400 in accordance with one or more embodiments of the invention. The data may be any type of data in any format and of any length. FIG. 3b is a diagram of slices 410, 420 and 430 of the data 400. Each slice of the data may include separate, distinct portions of the data 400. Each of the slices may be of different, but similar lengths. For example, each slice may include approximately 8 megabytes of data, e.g., a first slice may include 8.05 megabytes of data, the second slice may include 7.93 megabytes of data, etc. In one or more embodiments of the invention, the average amount of data of each slice is between 4 and 16 megabytes.

Figure 3C:
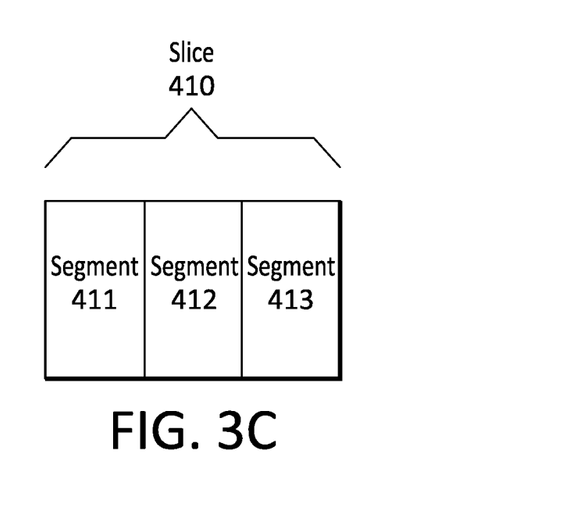
FIG. 3c discloses aspects of example segments of a data slice.

FIG. 3c is a diagram of segments 411, 412, and 413 of a slice 410 of the data 400. Each segment may include separate, distinct portions of the slice 410. Each of the segments may be of different, but similar lengths. For example, each segment may include approximately 8 kilobytes of data, a first segment may include 8.03 kilobytes of data, and the second segment may include 7.96 kilobytes of data. In one or more embodiments of the invention, the average amount of data of each segment is between 4 and 16 kilobytes.

C. Functional Overview

As noted earlier, a concern with the eventual consistency approach to data object access is that a read after an update may not return the most recent update to the data object. However, namespace consistency can be achieved, that is, after an object is written, its name will appear, almost immediately in some cases, in the namespace for all readers. Embodiments of the invention operate to leverage such namespace consistency. In general, data objects, including updated versions of data objects, are written with unique names that include some type of unique identifier, for example, a timestamp, counter, hash, or other unique value. The most recent version of the data object can be ready by performing a query with a prefix string and selecting the most recent version to read. To illustrate, object versions A, A.1, and A.2 may all be written in order over a period of time. A query specifying "list all objects whose prefix is 'A'" will return A, A.1 and A.2, where 1 and 2 refer to respective unique values that increment with respect to time, such as timestamp values. The reader can then easily identify A.2 as being the most recent version, and can select that version to be read out. That is, an example format for the versions of object A may be generally written thus: ObjA#timestamp. The scope of the invention is not limited to any particular object name format however.

Put another way, a general approach is to name objects with a unique value that is modified before an update is written to the object store. In some cases, the unique value is a counter that is incremented in such a way as to enable a determination, as between two or more object versions, as to which object version is the most recent object version. When reading a data structure from object storage, a call is made to the underlying list functionality with a prefix string that will return all data structures that are named with the prefix. The most recent version, which is guaranteed by the eventual consistency model to be correct, is then read.

D. Naming Protocols and Associated Functionality—Object Recipes/Slices

In general, when a client, such as client 200, writes an object into the deduplication service 310, the object is represented with an object recipe that references one or more slice recipes. To illustrate, suppose that a client writes an object to the deduplication service 310 and then writes it a second time with some modifications relative to the object that was first written. When the client reads the object back later, the client should receive the second version of the object, since that version was written most recently.

However, because a system or environment may have multiple processing nodes and queue systems, it is possible for either version to be written last into the storage system and replace the other version. Accordingly, embodiments of the invention operate to append a unique identifier, such as a timestamp for example, to the object name when generating an object recipe name. Because each version of the object recipe has a different respective identifier, both versions of the object recipe, that is, the new version and the old version, can be written to the underlying object storage without overwriting each other. In some instances, the timestamp is assigned when the object PUT command is first received. In a case where two clients write an object with the same name, only the latest version of the object is retained, at least in some embodiments.

When a client reads back the object, such as by way of a read request, an internal list call is performed with the object name prefix, and the user can then select the version with the most recent, that is, highest, timestamp to return to the client. Slice recipes for an object have names that include the object name and timestamp to prevent different versions of an object from accessing incorrect slice recipes.

A variety of approaches can be used to obtain a consistent timestamp in a distributed system. One example of such a technique is for all nodes to query a central node for a timestamp. Because all timestamps are assigned by the central node, there is assurance that the same timestamp would not be applied to different object versions.

Another approach for employing unique identifiers such as timestamps involves the use of a load balancer. For example, if the storage calls from one or more clients pass through a load balancer, the load balancer could provide the timestamp. As an alternative to a timestamp, a unique counter could be used. In some systems, the object storage protocol includes a client timestamp in the calls, so that a client-consistent time can be used. Some embodiments of the invention may use the time provided by the frontend node that receives the object from the client. This approach may provide acceptable results in cases where multiple frontends have their clocks synchronized. Where such clocks are not synchronized, another approach may be called for.

In still other embodiments, a client may provide a timestamp as part of the communication protocol used by the client to communicate with, for example, a deduplication service of a cloud storage environment. As a final example, a timestamp generation and assignment approach may be employed in which the first node of a cloud storage environment front end to receive a PUT call from a client uses its clock to assign a timestamp.

It should be noted that the scope of the invention is not limited to the use of timestamps as unique identifiers for object versions. More generally, for example, any arbitrary, and increasing, unique value can be used as an identifier.

E. Name Protocols and Associated Functionality—Similarity Groups

As noted elsewhere herein, similarity groups are an example of a data structure, and may be used by a deduplication process to track which sequences of segments are similar. A similarity group may reference multiple different compression regions, and similarity groups may be updated as a new, related, compression region is referenced by a similarity group. It should be noted that updates to a similarity group must be persisted to protect against data loss. As well, similarity groups may also be used when reading back an object in response to a client read request.

In more detail, similarity groups are a data structure that records a mapping from compression regions to lists of fingerprints. During deduplication, when an object is partitioned into slices, a similarity group ID is generated for each slice, and the slice is deduplicated against the similarity group with that ID. Various techniques may be employed for generating a similarity group ID for a slice such as selecting a few bytes from each fingerprint and selecting the minimal (or maximal) value. Other techniques that may be employed calculate hashes over the fingerprints.

After deduplicating a slice against a similarity group, any remaining unique segments from the slice are concatenated together, compressed, and written as a compression region. The similarity group is updated to record the compression region and its fingerprints both for future deduplication purposes and reading back the object later.

As noted earlier, every update to a similarity group must be persisted to protect against a data loss if a node crashes. Thus, an approach employed by embodiments of the invention to maintain consistency is to append a transaction ID to the name of the similarity group, which is incremented before each write to the underlying object storage. When accessing a similarity group, a search may be performed to identify all similarity groups that match a prefix string with the similarity group ID, and subgroup ID as described below, and the version with the highest transaction ID may then be selected.

For performance reasons, it may be desirable to write, at least temporarily, versions of a similarity group to faster media than object storage. The incremental updates may be written to a write-ahead log, though they could alternatively be written to block storage or persistent memory. For cost reasons, it may be desirable to limit the amount of other media used, and write to object storage periodically and remove the version in other media. After a crash, there is typically a need to update the version in object storage with any updates written to other media. The transaction IDs may be leveraged to accelerate recovery. As the faster media is replayed, if the transaction ID in object storage is higher than the transaction ID in the other media, then that update has already been applied and can be skipped.

It may be useful to control the size of similarity groups such that they do not become too large to fit in memory or take too long to read/write to object storage. As such, some embodiments of the invention limit similarity groups to 8 MB in size, but other values can be determined based on memory and object storage properties. Due to this size limit, the size of a similarity group may be capped with a threshold size. Other incoming slices may map to the same similarity group, such that there is still a need to support deduplication for the similarity group ID. For this reason, similarity groups not only have an ID value but also a subgroup ID, which is based on how many times a similarity group reached the maximum size.

When a similarity group reaches its maximum size, it is written to object storage, and a new similarity group with the same ID and larger, that is, incremented, subgroup ID is created. It starts at transaction ID zero (0) for each new incremented subgroup ID. When performing deduplication, deduplication is performed against the similarity group with the highest subgroup ID and the highest transaction ID within that subgroup ID. While there may be a loss of some potential deduplication against earlier subgroup IDs of the similarity group, this approach can be a reasonable tradeoff to increase performance.

When a client reads back an object, this results in reading of a slice recipe. That is, when reading an object, the slice recipe references a similarity group and sub-group specifically, and the objection with the highest transaction ID is returned. From a slice recipe, the referenced similarity group is read that leads to compression regions. In each case, the correct version of each data structure is read based on the naming convention. In this way, the most recent data object version is consistently read.

As noted herein, embodiments of the invention may employ a garbage collection process. Thus, for example, older versions of every data structure can be removed during a full garbage collection process that identifies the most recent version of each structure and removes older versions. That is, similarity groups with lower transaction IDs can be removed periodically. Based on the naming convention of each structure, a garbage collection algorithm can remove versions that do not have the most recent timestamp or transaction ID. All subgroups of a similarity group must be kept, unless unreferenced by slice recipes. Because of the resource-intensive nature of garbage collection, garbage collection may be run infrequently such as once a week or less often. In some embodiments, garbage collection may be performed, for example, when a similarity group with a new transaction ID, or other unique identifier, is written.

When incrementing a subgroup ID, the lower numbered subgroup will no longer have more compression regions added to it, so it is read-only and could be cleaned without the locking issues of a similarity group that is read-write. In some embodiments, this approach may be modified to delete similarity groups with lower transaction IDs after writing the next higher transaction ID.

Advantageously then, the garbage collection processes enabled by the naming protocols disclosed herein may reduce the amount of storage space consumed by data.

It is noted that one side-effect of the transaction ID system for similarity groups and their frequent updates is that there may be numerous versions of a similarity group. While the previously discussed garbage collection process can remove older versions, embodiments of the invention embrace optimization methods and processes that will more quickly remove unneeded versions. To illustrate, when a similarity group with a higher subgroup ID is stored, due to the size threshold being met, it is safe to clean the lower numbered subgroups because it is only accessed for reads and no longer modified. In one version, all of the versions with transactions IDs lower than the highest value for the subgroup are deleted.

A further approach to implementing optimization during similarity group cleaning is to copy the similarity group with the highest transaction ID and store it without the transaction ID in the name. Then, all versions with transaction IDs can be deleted. When performing reads of a similarity group, the initial approach may involve simply trying the name without the transaction ID. If that fails, then a list based on the similarity group's name prefix can be generated, and the version with the highest transaction ID read. The advantage of this approach is that in many cases, calling of the list function can be omitted, and a similarity group read in one call. Advantageously, reducing calls to the underlying object storage system may decrease the latency experienced by customers.

With the foregoing discussion concerning similarity groups in view, attention is directed briefly to one particular example of a naming convention that may be employed in some embodiments of the invention. As noted, similarity groups and the other data structures disclosed herein may involve the use of a naming convention or protocol, which may assign a unique name to a data structure such as a similarity group. One example format of similarity group naming protocol may take the form: SG#ID#SUBID#Trans_ID. In this illustrative example, "SG" denotes that the name refers to a similarity group, one or more fields # are reserved for hash values, and the "ID" may be a randomized 4 byte similarity group value computed based on a slice that corresponds to the similarity group. Because a similarity group may include various sub-groups, a "SUBID" field identifies a particular subgroup ID of the similarity group. Finally, the "Trans_ID" identifies a transaction identification (ID) that increments as a similarity group is updated. Thus, when an object version is read, the slice recipe references a similarity group, and a specific sub-group of the similarity group. The transaction ID values of that sub-group can then be examined, and the object version corresponding to the most recent transaction ID is then read.

F. Example Host and Server Configurations

Figure 4:
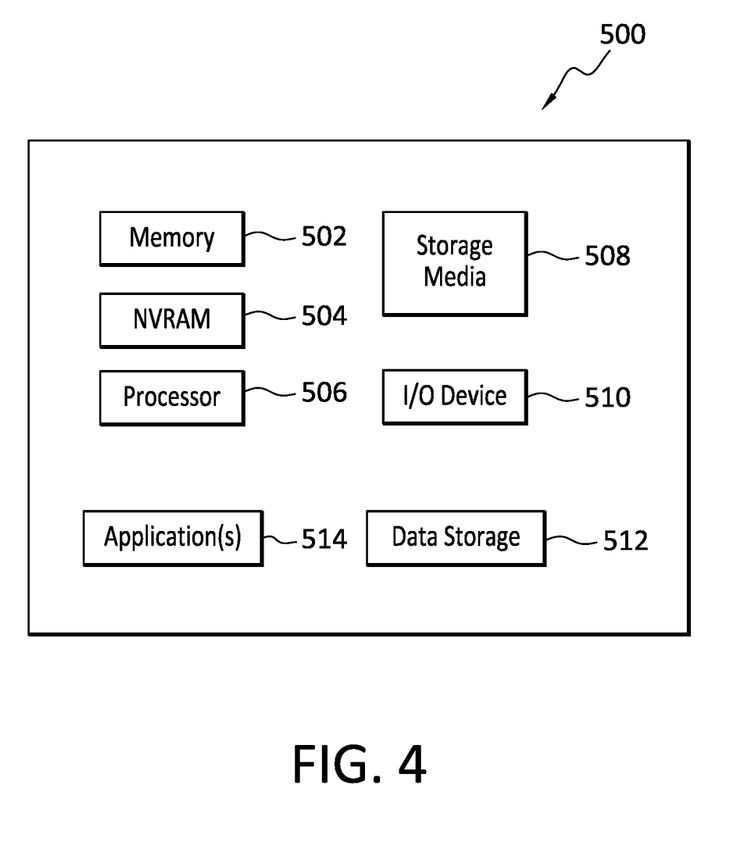
FIG. 4 discloses aspects of an example host configuration.

With reference again to FIGS. 1 and 1a, and directing attention now to FIG. 4 as well, any one or more of the clients 200 and its components, deduplication service 300, frontend micro-services 316, backend micro-services 314, message manager 318, garbage collection module 312, metadata server 324 and its components, and persistent storage 350 may comprise, or be hosted on, a physical computing device, one example of which is denoted at 500. As well, any of the disclosed elements that generate and/or assign a unique identifier to a disclosed data structure, may comprise, or be hosted on, a physical computing device. Such generating elements include, but are not limited to, a client, node, and load balancer. Finally, where any of the aforementioned components or elements comprise or consist of a VM, that VM may constitute a virtualization of any combination of the physical components disclosed in FIG. 4.

In the example of FIG. 4, the physical computing device 500 includes a memory 502 which can include one, some, or all, of random access memory (RAM), non-volatile random access memory (NVRAM) 504, read-only memory (ROM), and persistent memory, one or more hardware processors 506, non-transitory storage media 508, I/O device 510, and data storage 512. One or more of the memory components 502 of the physical computing device can take the form of solid state device (SSD) storage. As well, one or more applications 514 are provided that comprise executable instructions. Such executable instructions can take various forms including, for example, any of the methods, or portions thereof, disclosed herein.

G. Aspects of Some Example Methods

Figure 5:
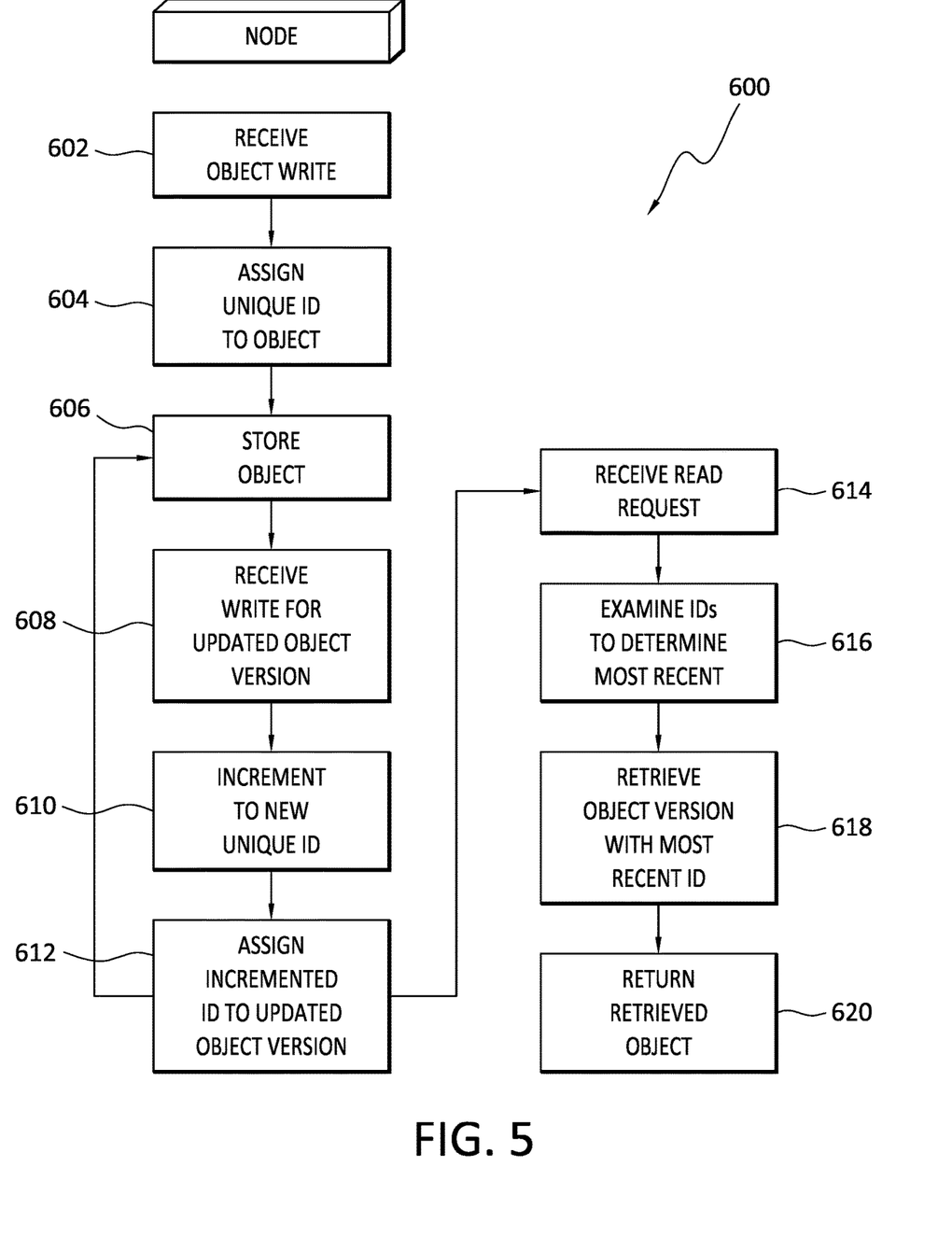
FIG. 5 discloses aspects of some example methods.

Directing attention now to FIG. 5, details are provided concerning methods for retrieving data objects. At least some embodiments of the methods may be performed in a data storage environment that is configured to deduplicate and/or store data, and/or to respond to read operations and write operations. Other example environments for embodiments of the invention are disclosed elsewhere herein. It should be noted that while the example method of FIG. 5 refers specifically to objects and object versions, that general method can be applied to any of the other data structures disclosed herein, and is not limited to use with objects and object versions.

Turning now to FIG. 5, one example method is denoted generally at 600. The method 600 may begin when a new object, or new version of an existing object, is received 602 in connection with a write request. The new object may also be referred to herein as being a version, that is, an initial or first version of an object. The write request may be generated by a client, and transmitted by the client to a datacenter, for example. After receipt of the write request, the datacenter or other entity assigns 604 a unique identifier to the object, or object version, as the case may be. As disclosed herein, the unique identifier may be a timestamp, for example, although the use of timestamps is not required. In any event, after assignment of the unique identifier, the associated object, or object version, is then stored 606 in association with the assigned unique identifier.

On one or more subsequent occasions, a write request for an updated object version may be received 608. After receipt of such a write request, a unique identifier is generated 610 for the updated object version. As disclosed herein, the newly generated unique identifier may be created by incrementing, on a time basis for example, an immediately preceding unique identifier such that a comparison of the unique identifiers of two or more object versions will reveal which of the object versions is the most recent. By way of illustration, examination of two different object versions with different respective timestamps will readily reveal which timestamp and, therefore, which object version, is the most recent.

At 612, the unique identifier for the updated object version is assigned, or otherwise associated with, the updated object version. The updated object version and associated unique identifier are then stored 606.

At some point after an object and one or more object versions are stored 606, a read request may be received 614, such as at a datacenter from a client, for example. The read request may or may not specify a particular object version, or may simply indicate that the most recent update to the object should be returned. The datacenter, or other recipient of the read request, may then examine the various identifiers to determine 616 which is the most recent. In some embodiments, this determination can be made by performing a list call, or other operation that requests all object versions with the same prefix. Then, the object version that is determined to be the most recent version, based on unique identifier, is identified 616 and retrieved 618. The retrieved object version can then be returned 620 to the requestor. It should be noted that the processes 614-620, or sub-groupings of those processes, may be performed repeatedly, or only once.

Finally, it should be noted with respect to FIG. 5, that all of the disclosed processes need not be performed in any particular implementation. That is, FIG. 5 embraces a group of possible processes that may be performed at various times and/or in various sequences and groupings. As such, various combinations and subsets of the processes shown in FIG. 5 may be performed, consistent with various embodiments of the invention. To illustrate, one example embodiment of a method within the scope of the invention may begin at 608 and end at 612. In another example embodiment, a process begins at 614 and ends at 620. Thus, different methods within the scope of the invention may begin and/or end at different points and times and, as such, may embrace different respective combinations and subsets of the processes disclosed herein. As such, FIG. 5 is not intended to require, nor should it be interpreted as requiring, any particular grouping of processes, timing of processes, or order of processes.

As disclosed herein, it will be appreciated that the example method 600 may avoid the problem of eventual consistency presented by data storage models. Particularly, because a unique respective identification (ID) is assigned to each different version of an object or other data structure, the issuer of a read request pertaining to that object or other data structure can be assured that the most recent version of that object or other data structure will be returned, notwithstanding that multiple versions of the object or other data structure may exist at the time the request ready was made, received, and/or responded to. Moreover, because a namespace in which the various object versions are listed may be updated almost immediately after an object version is written, the namespace may provide a reliable indication as to what versions of an object, or other data structure, exist, and which version is the most recent.

As well, embodiments within the scope of the disclosure may include any one or more of a variety of different features. Such features include, but are not limited to: writing data structures in a deduplicated object storage system with names that are updated each time the structure is written persistently and reading the highest named version; naming object recipes and slice recipes based on a timestamp or counter value that is globally unique within the cluster; naming compression regions with a hash of the contents; generating a unique ID for a structure based on a hash of the contents of the structure; naming similarity groups with a transaction ID that is incremented for each update to the similarity group; creating subgroups of similarity groups with a higher numbered subgroup ID when the size of similarity group exceeds a threshold; performing deduplication against a similarity group with the highest subgroup ID and, within that subgroup ID, the highest transaction ID; deleting older versions of data structures while preserving the version named with the highest unique value; after incrementing a subgroup ID, cleaning a similarity group with a lower numbered subgroup ID by removing all except the highest transaction ID; after incrementing a subgroup ID, copying the similarity group with the next lower subgroup ID and highest transaction ID and naming it without a transaction ID, then deleting all versions with a transaction ID, such that reads will first try the similarity group name without a transaction ID, and if the read fails, then a read is performed for the highest transaction ID; and, optimizing to use a name without the unique ID to make reads faster, when that renaming can be safely performed because the structure will no longer be modified.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving a write request that includes a data structure version to be written, wherein the data structure version is assigned a unique identifier that is generated based on a hash of contents of the data structure, the data structure comprising a similarity group that records a mapping between a compression region comprising a compressed group of data portions, and fingerprints of the data portions that make up the compression region;
appending, to a name of the similarity group, a transaction ID that is incremented for each update that is made to the similarity group;
storing the data structure version in association with the unique identifier;
receiving a read request for a most recent version of the data structure;
when the stored data structure version is not the most recent version of the data structure, examining respective unique identifiers of each of a plurality of other stored data structure versions to determine which stored data structure version is the most recent; and
returning the most recent data structure version, notwithstanding that one or more other data structure versions existed at the time that the read request was received.

2. The method as recited in claim 1, wherein the read request is received from a deduplication microservice.

3. The method as recited in claim 1, wherein when the size of the similarity group exceeds a threshold, the method further comprises creating a new subgroup having a subgroup ID that has a relatively higher value than a prior in time subgroup ID.

4. The method as recited in claim 1, wherein as between the similarity group and one or more other similarity groups, the method further comprises performing data deduplication against the similarity group with the highest subgroup ID and, within that highest subgroup ID, the highest transaction ID.

5. The method as recited in claim 1, wherein namespace consistency is achieved before the stored data structure version is available to fulfill the read request.

6. The method as recited in claim 1, wherein the compression region is shared by multiple objects.

7. The method as recited in claim 1, wherein the method is performed in a data protection environment that implements an eventual consistency model.

8. The method as recited in claim 1, wherein determining which stored data structure version is the most recent comprises performing a list call that includes a data structure name prefix that is common to two or more of the stored data structure versions.

9. The method as recited in claim 1, wherein the unique identifier of a data structure version prevents that data structure version from being overwritten by another data structure version with a different unique identifier.

10. The method as recited in claim 1, wherein the method further comprises deleting all but the newest data structure version.

11. The method as recited in claim 1, wherein as between successive unique identifiers, a second one of the successive unique identifiers reflects a time increment relative to a first one of the successive unique identifiers.

12. The method as recited in claim 1, wherein as between a second unique identifier that succeeds a first unique identifier, the second unique identifier has a value that is greater than a value of the first unique identifier.

13. The method as recited in claim 1, wherein the unique identifier associated with the data structure version included in the write request is assigned either by a component of a datacenter, or by an entity that issued the write request.

14. The method as recited in claim 1, wherein one or more of the data structure versions comprise deduplicated data.

* * * * *